United States Patent [19]

Evans et al.

[11] 4,208,442

[45] Jun. 17, 1980

[54] COMPOSITION FOR USE IN PREPARING A BAKED COATED COMESTIBLE

[75] Inventors: David N. Evans, Dover; Walter W. Moore, Felton, both of Del.; Jean L. Ng, Sarnia, Canada

[73] Assignee: General Foods Corporation, White Plains, N.Y.

[21] Appl. No.: 953,399

[22] Filed: Oct. 23, 1978

[51] Int. Cl.² ............................................. A23L 1/176
[52] U.S. Cl. ..................................... 426/296; 426/92; 426/94; 426/96; 426/104; 426/285; 426/293; 426/555; 426/622; 426/652
[58] Field of Search .................. 426/92, 94, 293, 296, 426/555, 289, 291, 285, 652, 622, 96, 104, 573, 574, 576

[56] References Cited

U.S. PATENT DOCUMENTS

| | | | |
|---|---|---|---|
| 3,471,301 | 10/1969 | Mitchell et al. | 426/91 |
| 3,527,646 | 9/1970 | Scheick et al. | 426/289 |
| 3,586,512 | 6/1971 | Mancuso et al. | 426/250 |
| 3,843,827 | 10/1974 | Lee et al. | 426/293 |
| 3,852,501 | 12/1974 | Fazzina et al. | 426/293 |
| 4,060,645 | 11/1977 | Raisler et al. | 426/302 |

FOREIGN PATENT DOCUMENTS 901712 7/1962 United Kingdom ..................... 426/573

*Primary Examiner*—Steven L. Weinstein
*Attorney, Agent, or Firm*—Mitchell D. Bittman

[57] ABSTRACT

A dry coating composition is employed to coat a moistened fowl which upon being baked imparts the resultant fowl with a crisp, uniform and adherent coating which has the taste, texture and appearance of a fried coated fowl. The dry coating composition comprises bulking agents containing crumbs or fines and a flour, a protein and a binding agent containing a starch and/or a dextrin. The flour and a portion of the binding agent and the protein are mixed together and hydrated, followed by drying the mixture to form a coating premix which is part of the dry coating composition.

25 Claims, No Drawings

4,208,442

COMPOSITION FOR USE IN PREPARING A BAKED COATED COMESTIBLE

BACKGROUND OF THE INVENTION

Many foods such as poultry, meat, fish and vegetables are coated with a light coating of flour or bread crumbs which on frying in oil develops into a characteristic crispy, brown-colored coating. However, the messiness involved in the preparation of fried foods, the ever-present danger of splattering oil, and the unfavorable dietary aspects associated with fried foods have led recently to development of coatings which attempt to impart a fried appearance to a foodstuff which is baked and with the appealing color, taste and texture associated with fried foods.

U.S. Pat. No. 3,586,512 by Mancuso et al. and U.S. Pat. No. 3,843,827 by Lee et al. both prepare a baked comestible with a fried texture and appearance. The Mancuso, et al. patent does this by providing a dye system which changes color during cooking, while the Lee, et al. patent provides a unique batter formulation and dry mix coating. While both these systems are effective, improvements would be desirable either in the simulation of the texture and mouthfeel characteristics of fried foods, or in the simplification of consumer preparation.

Accordingly, it is a feature of this invention to provide a baked coated comestible with the taste, texture and appearance of a fried coated comestible.

It is a further feature of this invention to provide a dry coating composition which entails easy preparation for the consumer.

It is still a further feature of this invention to provide a baked coated comestible with a coating having a crisp texture and taste, a uniform coloration and appearance, and good adhesion to the comestible surface as well as the taste, texture and appearance of a fried coated comestible.

SUMMARY

Briefly stated, the instant invention is practiced by moistening the surface of a fowl then coating the moistened fowl with the dry coating composition of this invention and then baking the coated fowl. The dry coating composition of this invention comprises: 60–78% of bulking agents, the bulking agents containing 0–68% of crumbs or fines and 7–75% of a flour; 3–13% of a protein; and 4–13% of a binding agent, the binding agent containing 0–13% of a modified starch and 0–13% of a dextrin having a DE within the range of 5–50, the above percents being by weight of the total dry coating composition. A coating premix is formed by mixing together and hydrating the flour, from 5 to 95% by weight of the protein and from 15 to 85% by weight of the binding agent, followed by drying the hydrated mixture to form the coating premix, the coating premix being present in the dry coating composition at a level of 10 to 78% by weight of the total dry coating composition. The balance of the composition is made up of residual ingredients such as salt, spices, seasoning and coloring as well as optional ingredients, such as an oil or fat.

DETAILED DESCRIPTION OF THE INVENTION

The dry coating composition of this invention basically comprises a critical level of bulking agents, protein, binding agents and a coating premix, as well as seasoning and color. The bulking agents need be present in the dry coating composition at a level of 60 to 78%, the bulking agents containing 0 to 68% of crumbs or fines and 7 to 75% of a flour, the above percents being by weight of the total dry coating composition. The bulking agents are generally insoluble and function to provide bulk and filler material and provide a matrix for the coating which aids in crispness development and is essential in obtaining the texture and mouth-feel characteristics of fried foods.

The bulking agents of the dry coating composition preferably contain bread crumbs and/or fines (e.g., cereal fines) at levels of 25 to 50% by weight of the total dry coating composition. The bread crumbs may be of a formulation and may be processed by any means common in the art, but preferably for optimum crispness Japanese bread crumbs are employed. By Japanese bread crumbs what is meant is that the bread crumbs consist of essentially wheat flour, yeast and salt and have an elongated, porous and striated shape and structure. Other ingredients such as seasonings, shortening, milk solids, sugar, minor amounts of other flours (e.g., rice, barley, soy, etc.), whey solids, etc., may also be added to the Japanese bread crumb formulation.

Broadly, the crumbs or fines used in this invention have a particle size wherein up to 20% by weight of the crumbs or fines are retained on a USS 10 mesh screen, and up to 90% by weight of the crumbs or fines pass through a USS 60 mesh screen. Preferably the crumbs or fines have a particle size wherein 100% by weight of the crumbs or fines pass through a USS 10 mesh screen, up to 20% by weight of the crumbs or fines are retained on a USS 20 mesh screen, at least 25% by weight of the crumbs or fines are retained on a USS 40 mesh screen and up to 10% by weight of the crumbs or fines pass through on a USS 100 mesh screen.

The bulking agent also contains a flour as part of the dry coating composition, such as wheat, potato, tapioca, rice or corn flour. However, the flour preferably is a corn flour and/or a rice flour as the coating of the resultant baked coated comestible will achieve optimum crispness which is due, in part, to the lower water absorbativity of rice and corn flour. Corn flour is generally employed at a level of 0 to 55% (preferably 10 to 25%), and rice flour is generally employed at a level of 0 to 35% (preferably 5 to 15%), the above percents being by weight of the total dry coating composition.

Critical to the instant invention is the formation of a coating premix which contains the flour and a portion of the protein and the binding agent. The coating premix must be present in the dry coating composition at a level of 10 to 78% (preferably 25 to 50%) by weight of the total dry coating composition. The coating premix is essential to the dry coating composition as it improves adhesion, insures uniformity of the color and the coating, and increases the crispness of the coating. In addition, the 'floury' or powdery taste and mouthfeel generally associated with dry mixes which have high levels of flour are eliminated. Only a portion of the protein and the binding agent is included in the coating premix because if all the protein or binding agent is included in the premix, the resultant coating would not adequately adhere to the fowl or have the desired crispness, while if none of the protein or binding agent is included in the premix but instead is dry blended into the dry coating composition, there would be an apparent gummy and powdery mouthfeel, as well as substantial reduction in uniformity and crispness.

The dry coating composition contains a protein, from 5 to 95% (perferably 15 to 75%) by weight of the protein being included in the coating premix, with the remainder of the protein being blended into the dry coating composition. The protein may be a gelatin, sodium caseinate, soy protein isolate, or egg albumin and need to present in the dry coating compositions at a level of about 3 to 13% by weight of the total dry coating composition. Preferably the protein is a gelatin having a bloom within the range of 85 to 300.

The dry coating composition also contains a binding agent, from 15 to 85% (preferably 25 to 80%) by weight of the binding agent being included in the coating premix, with the remainder of the binding agent being blended into the dry coating composition. The binding agent must be present in the dry coating composition at a level of 4 to 13% by weight of the total dry coating composition, the binding agent containing 0 to 13% (preferably 3 to 9%) of a modified starch and 0–13% (preferably 3 to 9%) of a dextrin, the above percents being by weight of the total dry coating composition. The modified starch employed is one which has a low viscosity and high moisture adsorption and desorption rates as well as good film-forming properties which are critical to obtaining optimum crispness in the resultant baked coated comestible. The modified starch acts similar to a dextrin in its ability to absorb and release moisture, but the film-forming properties are superior thereto. For example, a starch modified using 1-octenyl-succinic anhydride provides optimum emulsive and film-forming properties which are suitable in the instant invention. A dextrin is employed as part of the binding agent to aid coatability and crispness development, and the dextrin employed should have a Dextrose Equivalent (DE) within the range of 5–50, and includes malto dextrins, dextrins and corn syrup solids.

The coating premix is formed by mixing together the flour and a portion of the protein and the binding agent, hydrating the mixture, followed by drying. Other ingredients may also be mixed in as part of the premix such as processing aids and color, but some ingredients such as seasonings and bread crumbs or fines are preferably blended into the dry coating composition itself to avoid loss of flavor or effectiveness of the ingredient. preferably after the mixture is hydrated it is extruded, sheeted or pelletized thus reducing the mixture to a size practical to dry. Care must be taken not to subject the hydrated mixture to temperatures and conditions sufficient to gelatinize the starch in the flour. Generally temperatures during processing of the premix should not exceed 70° C. to minimize gelatinization, as higher temperatures may cause increased gelatinization of the starch in the flour resulting in a flour with an increased ability to absorb water which will adversely affect the crispness of the coating of the baked fowl. After drying the particle size of the coating premix should be reduced (i.e. ground) in any conventional manner to promote ease of coating of the fowl, preferably to a size wherein 95% by weight of the premix passes through a USS 50 mesh screen.

In a preferred embodiment of this invention, the protein is codried with a binding agent (i.e. the modified starch and/or the dextrin) in order to increase the solubility of the protein, this codrying step being carried out before the protein or binding agent is incorporated into the coating premix. When codrying, the preferred protein is gelatin and while the protein can be codried with the modified starch or the dextrin or both, preferably the protein is codried with the modified starch. The codrying is carried out by hydrating (e.g. to moisture content of 60 to 90%) the mixture of protein and a binding agent (i.e., modified starch and/or dextrin), then subjecting the hydrated mixture to temperatures and conditions sufficient to solubilize the protein (typically temperatures greater than about 50° C.), followed by conventional drying (e.g., drum, air, spray, etc.) and then grinding to a size suitable for blending into the coating premix and the dry coating composition. Typically the codried protein and binding agent are ground to a size wherein 100% by weight of the particles pass through a USS 20 mesh screen, while at least 50% by weight of the particles are retained on a USS 200 mesh screen. Codrying of the protein and a binding agent unexpectedly provides a synergistic effect enabling a substantial reduction in the levels of both the protein and the binding agent needed for an acceptable coating (crisp, adhesive, uniform, etc.), even though only the solubility of the protein is increased. For example, when gelatin and modified starch are codried, the increased solubility and effectiveness of these ingredients allow for as much as a 50% reduction in both of their levels to obtain an acceptable coating.

A comparison of dry mix coating compositions where the coating premix is formed versus where the ingredients, i.e., the flour and a portion of the protein and the binding agent, are simply blended together shows that the formulations with the premix have: (1) a more uniform coloration and fried appearance; (2) crisper texture; (3) better adhesion of the coating to the comestible; (4) a comestible with a higher yield by weight and less shrinkage; and (5) cleaner mouthfeel avoiding a floury, powdery sensation.

Upon baking a fowl coated with the dry coating composition, the film-forming ingredients in the dry coating composition and in the coating premix (i.e., the protein and the binding agent) combine with the water released from the fowl during baking to form a film uniformly over the fowl. The bulking agents act as a matrix for the coating, and during the latter stages of baking, the water is released by the film-forming ingredients which results in an extremely crisp coating.

The residual ingredients of the dry coating composition include salt, spices, seasoning and color and are generally employed at a level of 10 to 25% by weight of the total dry coating composition. The dry coating composition may also include residual ingredients such as processing aids to aid the formation of the coating premix, or antioxidants to aid in storage stability. Generally the residual ingredients employed in the dry coating composition comprise salt (up to 15%), lecithin, seasoning (e.g., pepper, garlic, paprika, sugar, onion powder, monosodium glutamate, etc.), processing aids (e.g., mono and diglyceride, silicone dioxide, etc.), preservations (e.g., BHA, TBHQ) and coloring blends (e.g., FD&C approved colors, paprika, beet powder, annatto, tumeric, etc.). Minor amounts of other ingredients such as fats or oils (shortening) can also be added.

The dry coating composition is applied to the fowl by first moistening the surface of the fowl and then coating the moistened fowl with the dry coating composition by any means common in the art. Such common means include applying the coating composition to the moistened fowl in a closed bag containing the composition, or simply covering the moistened fowl with the coating composition.

After this coating step, the coated fowl is then placed in an oven, preferably skin side up, and baked until done. Turning of the coated fowl during baking is not required. Generally, the temperature during baking is within the range of 160° to 235° C., preferably 190° to 220° C. Fowl which can be coated and baked according to the instant invention includes poultry, such as chicken and turkey, or wild birds, such as ducks or geese. The preferred fowl is chicken and, for example, chicken pieces or chicken cutlets are both suitable to be coated with the dry coating composition and then baked.

The following examples illustrate the invention. It should be understood, however, that these examples are merely meant to be illustrative and the invention is not limited thereto. The figures in parenthesis represent the level of ingredients included in the coating premix.

Example I

A dry coating composition was prepared containing the following ingredients:

| | | % |
|---|---|---|
| A. | Japanese bread crumbs | 35.4 |
| B. | Coating Premix | 35.4 |
| | 1. Corn flour | (14.2) |
| | 2. Rice flour | (10.0) |
| | 3. Modified Starch (modified with 1-octenylsuccinic anhydride) | ( 3.7) |
| | 4. Dextrin (10 DE) | ( 3.7) |
| | 5. Gelatin (240 Bloom) | ( 3.1) |
| | 6. Salt | ( 0.4) |
| | 7. Glyceryl monostearate | ( 0.2) |
| | 8. Color | ( 0.1) |
| C. | Spices | 15.9 |
| D. | Gelatin (240 Bloom) | 6.1 |
| E. | Modified starch (modified with 1-octenylsuccinic anhydride) | 3.1 |
| F. | Dextrin (10 DE) | 3.1 |
| G. | Salt | 1.0 |
| | | 100.0% |

The coating premix was formed by mixing together the corn flour, rice flour, modified starch, dextrin, gelatin, salt, glyceryl monostearate (processing aid) and color, followed by hydrating the mixture to 25% moisture. The hydrated mixture was rolled into a dough, cut into cubes, then air dried at 150° C. for 1 hour to reduce the moisture content to 4 to 6%. The coating premix was then ground to a size wherein 95% by weight of the premix passed through a USS 50 mesh screen.

The coating premix was then dry blended with the Japanese bread crumbs, spices, and the remaining gelatin, modified starch, dextrin and salt to obtain the dry coating composition.

The dry coating composition at a level of 100 grams was then used to coat 2½ lbs. (approx. 1135 gms) of moistened chicken pieces. The coated chicken pieces were placed skin side up and baked at 205° C. for 1 hour. The resultant baked coated chicken had an extremely crisp coating with a uniform coloration and coating, as well as good adhesion of the coating to the chicken. The crispy, brown-colored coating had the texture and mouthfeel characteristics as well as the appearance of fried chicken. There was no powdery or floury taste observed, and the chicken itself was moist and tasty.

Example II

A dry coating composition containing the following ingredients was prepared:

| | | % |
|---|---|---|
| A. | Japanese bread crumbs | 38.3 |
| B. | Coating Premix | 37.8 |
| | 1. Corn flour | (20.2) |
| | 2. Rice flour | ( 8.6) |
| | 3. Gelatin/Starch | ( 3.3) |
| | 4. Dextrin (10 DE) | ( 2.4) |
| | 5. Salt | ( 2.1) |
| | 6. Modified starch (modified with 1-octenylsuccinic anhydride) | ( 0.7) |
| | 7. Glyceryl monostearate | ( 0.3) |
| | 8. Color | (0.2) |
| C. | Spices | 17.2 |
| D. | Gelatin/Starch | 3.3 |
| E. | Dextrin (10 DE) | 1.7 |
| F. | Salt | 1.1 |
| G. | Monosodium glutamate | 0.6 |
| | | 100.0% |

A codried gelatin/starch mixture was first prepared by dry blending, at 50/50 by weight levels, a 240 bloom gelatin with a starch modified with 1-octenylsuccinic anhydride, then hydrating the mixture to a moisture content of 80%, followed by heating the mixture to a temperature of 65° C. in a mixing kettle to solubilize the protein, then drying the mixture on a double drum dried. The codried gelatin/starch mixture was then ground to a size wherein 100% by weight of the particles passed through a USS 20 mesh screen.

A portion of the codried gelatin/starch mixture was then mixed with the other ingredients of the coating premix, i.e., corn flour, rice flour, dextrin, salt, modified starch, glycerol monostearate and color and processed as in Example I. Then the coating premix was blended with the Japanese bread crumbs, spices, monosodium glutamate and the remaining codried gelatin/starch, dextrin and salt to obtain the dry coating composition.

The dry coating composition at a level of 90 grams was then used to coat 2½ lbs. (approx. 1135 gms.) of moistened chicken pieces. The coated chicken pieces were then placed skin side up and baked at 205° C. for 1 hour. The resultant baked coated chicken had a fried taste, texture and appearance. The coating was uniform and very crisp and exhibited good adhesion to the chicken, but without any powdery or floury taste. The chicken itself was moist and tender.

What is claimed is:

1. A dry coating composition, which, when coated onto a moistened fowl and then baked imparts the resultant fowl with a crisp, uniform and adhesive coating with the taste, texture and appearance of a fried coated fowl, which comprises:

60–78% of bulking agents, the bulking agents containing 0–68% crumbs or fines and 7–75% of a flour; 3–13% of a protein; and 4–13% of a binding agent, the binding agent containing 0–13% of a modified starch and 0–13% of a dextrin having a DE within the range of 5–50, the above percents being by weight of the total dry coating composition; the flour, from 5 to 95% by weight of the protein and from 15 to 85% by weight of the binding agent having been mixed together and hydrated followed by drying to form a coating premix, the dry coating composition containing the coating premix at a level of 10 to 78% by weight of the total dry coating composition.

2. Composition of claim 1 further comprising residual ingredients.

3. Composition of claim 2 wherein the modified starch has film-forming properties, a low viscosity and can readily absorb and release moisture.

4. Composition of claim 3 wherein the protein is chosen from the group consisting of gelatin, egg albumin, soy protein isolate and sodium caseinate.

5. Composition of claim 4 wherein the modified starch has been modified with 1-octenylsuccinic anhydride.

6. Composition of claim 5 wherein said flour comprises 0 to 55% of a corn flour and 0 to 35% of a rice flour, the above percents being by weight of the total dry coating composition.

7. Composition of claim 6 wherein the protein is gelatin having a bloom within the range of 85 to 300.

8. Composition of claim 7 wherein the dry coating composition comprises 10 to 25% of the corn flour, 5 to 15% of the rice flour, 25 to 50% of the bread crumbs and 25 to 50% of the coating pre-mix, the above percents being by weight of the total dry coating composition.

9. Composition of claims 5 or 8 wherein the dry coating composition comprises 3 to 9% of the modified starch and 3 to 9% of the dextrin, the above percents being by weight of the total dry coating composition.

10. Composition of claim 9 wherein 15 to 75% by weight of the protein and 25 to 80% by weight of the binding agent are mixed into the coating premix.

11. Composition of claim 8 wherein the crumbs consist essentially of wheat flour, yeast and salt and have an elongated, porous and striated shape and structure.

12. Composition of claims 5 or 11 wherein the crumbs or fines have particle size wherein up to 20% by weight of the crumbs or fines are retained on a USS 10 mesh screen and up to 90% by weight of the crumbs or fines pass through a USS 60 mesh screen.

13. Composition of claim 12 wherein 100% by weight of the crumbs or fines pass through a USS 10 mesh screen, up to 20% by weight of the crumbs or fines are retained on a USS 20 mesh screen, at least 25% by weight of the crumbs or fines are retained on a USS 40 mesh screen and up to 10% by weight of the crumbs or fines pass through a USS 100 mesh screen.

14. Composition of claims 5 or 7 wherein the coating premix is ground to a particle size wherein up to 10% by weight of the premix by weight is retained on USS 30 mesh screen.

15. Composition of claim 10 wherein the coating premix has a particle size wherein 95% by weight of the premix passes through a USS 50 mesh screen.

16. Composition of claims 5 or 8 wherein the coating premix is formed under conditions and temperatures to minimize gelatinization of any starch in the flour.

17. Composition of claim 16 wherein after hydrating and mixing the flour, the protein and the binding agent, the mixture is extruded, followed by drying.

18. Composition of claims 5 or 7 wherein before forming the premix, a mixture of the protein and either the modified starch or the dextrin or both, are hydrated, and subject to conditions and temperatures sufficient to solubilize the protein, followed by codrying the mixture.

19. Composition of claim 18 wherein the mixture is of the gelatin and the modified starch.

20. Composition of claim 2 wherein the residual ingredients contain salt, spices, seasoning and color.

21. Composition of claim 20 further comprising an oil or fat.

22. Composition of claim 20 wherein the residual ingredients contain an antioxidant and a processing aid.

23. Composition of claim 10 wherein the fowl which is to be coated is chicken.

24. Process for preparing a baked coated fowl with a crisp, uniform and adhesive coating with the taste, texture and appearance of a fried coated fowl comprising moistening a fowl, then coating the moistened fowl with the dry coating composition of claim 10, then baking the coated fowl.

25. Process of claim 24 wherein the fowl is chicken and is baked at a temperature of 160° to 235° C.

* * * * *